United States Patent
Fukami et al.

(10) Patent No.: US 9,343,840 B2
(45) Date of Patent: May 17, 2016

(54) INTERFACE CONNECTOR

(71) Applicant: J.S.T. Mfg. Co., Ltd., Osaka-shi (JP)

(72) Inventors: Tsuyoshi Fukami, Kanagawa (JP); Yoichi Nakazawa, Kanagawa (JP)

(73) Assignee: J.S.T. MFG. CO., LTD., Osaka (JP)

( * ) Notice: Subject to any disclaimer, the term of this patent is extended or adjusted under 35 U.S.C. 154(b) by 1 day.

(21) Appl. No.: 14/254,000

(22) Filed: Apr. 16, 2014

(65) Prior Publication Data

US 2014/0315438 A1 Oct. 23, 2014

(30) Foreign Application Priority Data

Apr. 18, 2013 (JP) ................................. 2013-087881

(51) Int. Cl.
*H01R 24/00* (2011.01)
*H01R 13/516* (2006.01)
*B23K 26/00* (2014.01)
*H01R 13/6581* (2011.01)
(Continued)

(52) U.S. Cl.
CPC .......... *H01R 13/516* (2013.01); *B23K 26/0006* (2013.01); *B23K 26/0066* (2013.01); *H01R 13/6581* (2013.01); *H01R 13/6594* (2013.01); *B23K 2203/50* (2015.10); *H01R 12/727* (2013.01)

(58) Field of Classification Search
CPC .. H01R 13/648; H01R 12/727; H01R 13/516; H01R 13/6581; H01R 13/6594; B23K 26/0009; B23K 26/0066
USPC ...................................................... 439/626
See application file for complete search history.

(56) References Cited

U.S. PATENT DOCUMENTS

| 4,290,178 A | * | 9/1981 | Friese | ................... | H01R 43/20 227/119 |
| 2004/0058572 A1 | * | 3/2004 | Fromm | ................ | H01R 13/514 439/101 |

(Continued)

FOREIGN PATENT DOCUMENTS

| CN | 101728668 A | 6/2010 |
| CN | 102242334 A | 11/2011 |

(Continued)

OTHER PUBLICATIONS

Extended European Search Report dated Sep. 19, 2014 in the corresponding European patent application No. 14164136.5.

(Continued)

*Primary Examiner* — Abdullah Riyami
*Assistant Examiner* — Nader J Alhawamdeh
(74) *Attorney, Agent, or Firm* — Kratz, Quintos & Hanson, LLP

(57) ABSTRACT

An interface connector includes a housing, a plurality of contacts, and a square tube shaped shell. The housing integrally forms a header portion and a frame portion. The plurality of contacts is arranged in parallel on one face of the header portion, the shell is attached so as to cover an outer face of the housing. The shell includes a highly solderable layer formed on an inner face and an outer face including a plate-thickness face thereof, a pair of locking strips soldered to the printed circuit board, and an opening portion that is exposed outward and through which a counterpart housing is inserted and extracted, the opening portion including an end part (a plate-thickness face) of the opening portion which is turned black by laser irradiation.

6 Claims, 14 Drawing Sheets

(51) Int. Cl.
*H01R 13/6594* (2011.01)
*H01R 12/72* (2011.01)

(56) References Cited

U.S. PATENT DOCUMENTS

| | | | |
|---|---|---|---|
| 2004/0124228 A1* | 7/2004 | Chang | B23K 31/12 228/103 |
| 2008/0299408 A1 | 12/2008 | Guo et al. | |
| 2010/0173529 A1 | 7/2010 | He et al. | |
| 2010/0254662 A1 | 10/2010 | He et al. | |

FOREIGN PATENT DOCUMENTS

| | | |
|---|---|---|
| JP | 2010-92786 A1 | 4/2010 |
| JP | 2010092786 A * | 4/2010 |

OTHER PUBLICATIONS

Office Action of Chinese Patent Application No. 201410147859.5 mailed Nov. 3, 2015.

* cited by examiner

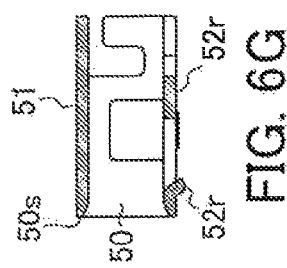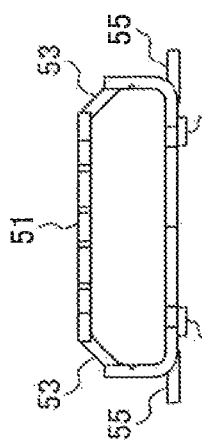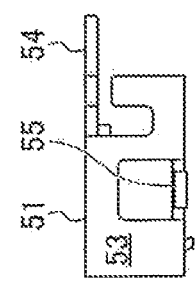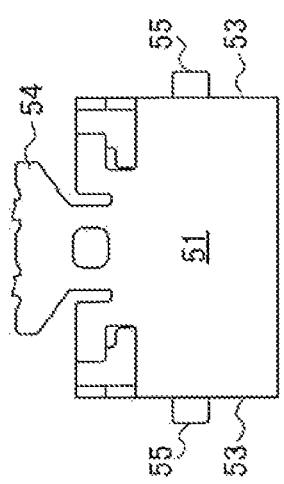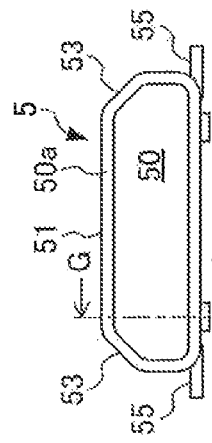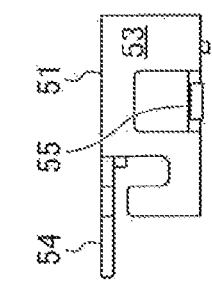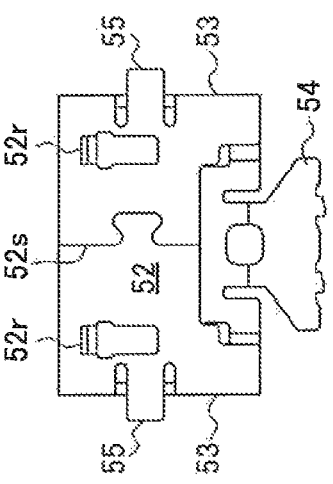

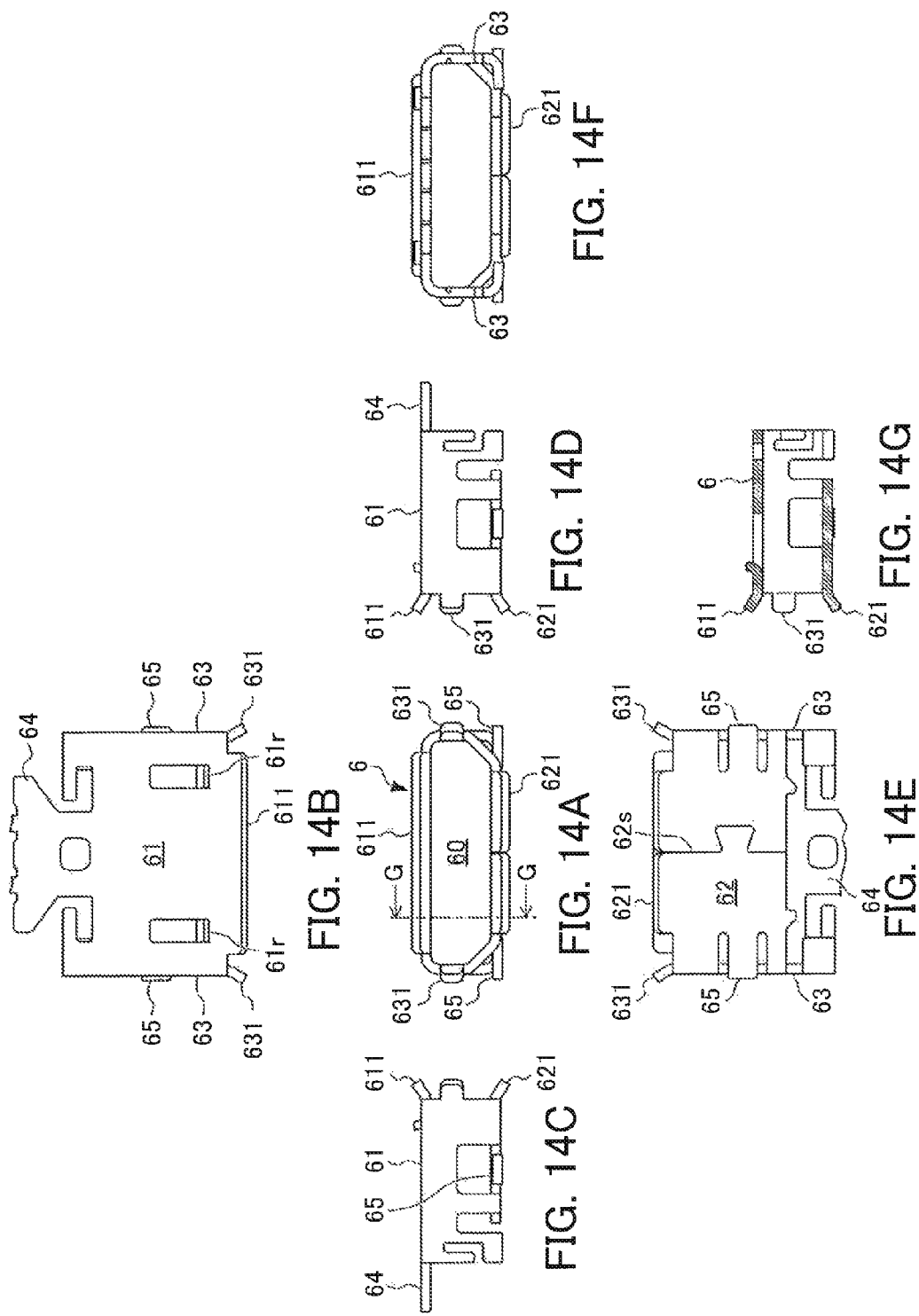

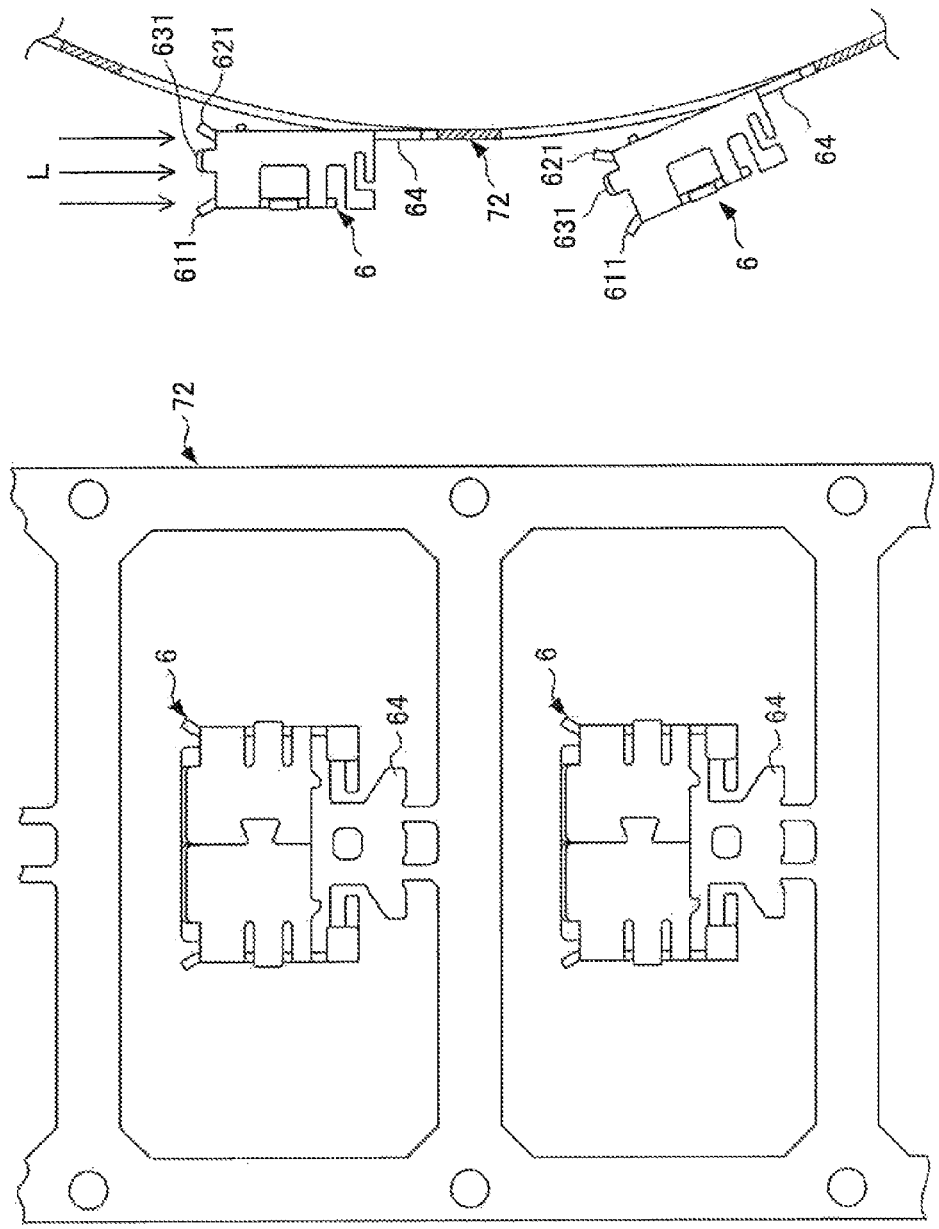

INTERFACE CONNECTOR

This application is based on and claims the benefit of priority from Japanese Patent Application No. 2013-087881, filed on 18 Apr. 2013, the content of which is incorporated herein by reference.

BACKGROUND OF THE INVENTION

1. Field of the Invention

The present invention relates to an interface connector. More specifically, the present invention relates to the structure of an interface connector in which a housing is covered by a shell made of metal and a part of the shell is soldered to a printed circuit board, the interface connector including the shell that maintains both an outer appearance mounted on an electronic device and solderability onto a printed circuit board.

2. Related Art

Interface connectors meeting the USB3.0 (Universal Serial Bus 3.0) standard, which is one of the interface standards, are mounted on electronic devices such as mobile phones, PDAs (Personal Digital Assistant), and lap-top computers. Such an interface connecter is connected with a USB cable whereby data can be transmitted and received between an electronic device and a peripheral device.

For such an interface connector (hereinafter abbreviated as "connecter"), a housing having an insulating property is surrounded by a shell made of metal and a portion of the shell is soldered to a mounted surface of a printed circuit board.

However, such a connector is arranged so that an opening of the shell for connecting with an external device faces a lateral face or the like of an electronic apparatus. On the other hand, for an electronic device, in a case in which the outer appearance thereof is coordinated in the color black, if a shell with a metallic color such as silver is exposed at a lateral face of the electronic device, a disadvantage arises which adversely affects the outer appearance of the electronic device.

In order to eliminate the abovementioned disadvantage, it has been considered to color an outer face of the shell in black using a method such as "paint coating", "plating in black", or "thin-film formation". However, these methods all degrade solderability to a printed circuit board. To address this, for example, Japanese Unexamined Patent Application, Publication No. 2010-92786 discloses a connecter that maintains an outer appearance at the time of being mounted on an electronic device and solderability to a printed circuit board.

In Japanese Unexamined Patent Application, Publication No. 2010-92736, a shell attached at a circumference of a housing having a contact and constituting an outer shell of the connector is produced by bending to form a base plate with a pattern punched in a predetermined shape. For the base plate, a highly solderable layer is formed on one side that is an outer surface of the shell and a black plated layer is formed on the other surface that is an inner surface of the shell. With such a configuration, since the connector disclosed in Japanese Unexamined Patent Application, Publication No. 2010-92786 has a black plated layer on the inner surface of the shell and a highly solderable layer on the outer surface of the shell, it improves an outer appearance at the time of being mounted on an electronic apparatus and solderability to a printed circuit board.

However, with the connector disclosed in Japanese Unexamined Patent Application, Publication No. 2010-92786, a shell is produced in a manner of bending to form after punching in a predetermined patterned shape the base plate for which a highly solderable layer is formed on one surface and a black plated layer is formed on the other surface. Therefore, a problem arises in that a metallic color is exposed on a plate-thickness face of the shell which adversely affects the outer appearance thereof. The number of processes may increase or the processes themselves may become complicated upon making the plate-thickness face of the shell in black.

SUMMARY OF THE INVENTION

The present invention addresses the abovementioned problem, and it is an object of the present invention to provide an interface connector that can maintain both an outer appearance mounted on an electronic device and solderability to a printed circuit board, and for which a plate-thickness face of the shell is easily colored black.

An interface connector according to one aspect of the present invention includes: an insulating housing including a frame portion and a band plate-shaped header portion projecting from the frame portion and being fit to a counterpart connector; a plurality of contacts arranged in parallel on one face of the header portion; and a conductive shell of a square tube shape that has an inner face surrounding the header portion and to which the frame portion is fixed internally, in which the shell includes an opening portion that is exposed outward and through which a counterpart housing is inserted and extracted, the opening portion including an end part of the opening portion that is turned black by way of laser irradiation.

In the abovementioned aspect, the interface connector may be a component called a receptacle, a receptacle connector, or a connector receptacle. The counterpart connector may be a component called a plug, a plug connector, or a connector plug. The counterpart housing may be a housing of a plug.

In the abovementioned aspect, the housing may be a housing made of a non-conductive material, and it is possible to acquire an insulating housing by molding an insulating plastic so that a band-shaped header portion to which the counterpart connector is fit is made to project from a frame portion.

In the abovementioned aspect, it is preferable for the contact to be made of a metal having conductivity and thus has conductivity for electrically connecting with a contact provided to the counterpart connector. Although it is preferable for the contact to be formed with a metal sheet with low electrical resistance such as a copper alloy, it is not limited to copper alloys The contact of the present invention may be a plate-shaped contact made of a copper alloy plate.

In the abovementioned aspect, it is preferable for the shell to be made of a metal sheet having conductivity. It is preferable for the shell to be formed with a metal sheet with low electrical resistance such as a copper alloy. The copper alloy plate has good processability, and thus it is possible to acquire a desired square tube-shaped shell having an opening through press working (punch processing) and bending work.

In the abovementioned aspect, the end part of the opening portion which is turned black by way of laser irradiation may include a predetermined plate-thickness face of the shell.

In the abovementioned aspect, the opening portion of the shell may include an upper portion guide strip that is configured such that an edge vicinity of an upper face portion of the shell is bent outward, a lower portion guide strip that is configured such that an edge vicinity of a lower face portion of the shell is bent outward, and a pair of lateral portion guide strips that is configured such that an edge vicinity of a lateral portion of the shell is bent outward. Then, the end part of the opening portion that is turned black by way of laser irradiation may include an extension portion of an inner face of the shell that corresponds to each guide strip, respectively. Alternatively, the end part of the opening portion that is turned black by way of laser irradiation may further include a plate-thickness face of the shell adjacent to the extension part.

In the abovementioned aspect, the shell includes: a highly solderable layer that is formed on an inner face and an outer face including a plate-thickness face of the shell; and a pair of locking strips for soldering that extends in opposite directions at a bottom face of the shell.

In the abovementioned aspect, the shell is formed by an unrolled metal sheet having a pattern on a carrier member being bent, the shell further including: a highly solderable layer that is formed on an inner face and an outer face of the shell including a plate-thickness face of the metal sheet; and a pair of locking strips soldered to a printed circuit board, the pair of locking strips being provided at a bottom face of the shell and extending in opposite directions according to a pattern of the metal sheet.

The abovementioned carrier member may be a thin metallic base plate or a band-shaped metallic base plate used for press working, and is called a carrier, a carrier strip, a carrier tape, etc.

Regarding the interface connector according to the abovementioned aspect, the end part of the opening portion of the shell is turned black by locally heating after forming a highly solderable layer on an inner face and an outer face including the plate-thickness face of the shell, by irradiating a laser towards the end part of the opening portion of the shell.

In the abovenmentioned aspect, the shell may include an end part of the opening portion that is turned black by way of laser irradiation, in a state in which the shell is being supported by the carrier member.

BRIEF DESCRIPTION OF THE DRAWINGS

FIGS. 6A to 6G illustrate the configuration of the shell provided to the interface connector according to the first embodiment, FIG. 6A being a front view of the shell, FIG. 6B being a plan view of the shell, FIG. 6C being a left side view of the shell, FIG. 6D being a right side view of the shell, FIG. 6E being a lower face view of the shell, FIG. 6F being a rear view of the shell, and FIG. 6G being a cross-sectional view along the arrow G-G in FIG. 6A;

FIGS. 14A to 14G illustrate the configuration of the shell mounted on the interface connector according to the second embodiment, FIG. 14A being a front view of the shell, FIG. 14B being a plan view of the shell, FIG. 14C being a left side view of the shell, FIG. 14D being a right side view of the shell, FIG. 14E being a lower face view of the shell, FIG. 6F being a rear view of the shell, and FIG. 14G being a cross-sectional view along the arrow G-G in FIG. 14A;

FIGS. 15A and 15B illustrate a state of a carrier being provided consecutively with a shell, FIG. 15A being a front, view of the carrier and FIG. 15B being a vertical sectional view in a state of the carrier being wound around a reel.

DETAILED DESCRIPTION OF THE INVENTION

The present inventors have found that a plate-thickness face of an end part of an opening portion of a shell can be easily turned black by irradiating a laser toward the end part of the opening portion of the shell after forming a highly solderable layer on an inner face and an outer face including the plate-thickness face of the shell, and based on this, arrived at inventing a novel interface connector based on this finding. In the following, modes of implementing the present invention are described with reference to the drawings.

1. First Embodiment 1.1 Configuration of Interface Connector

Figure 1:
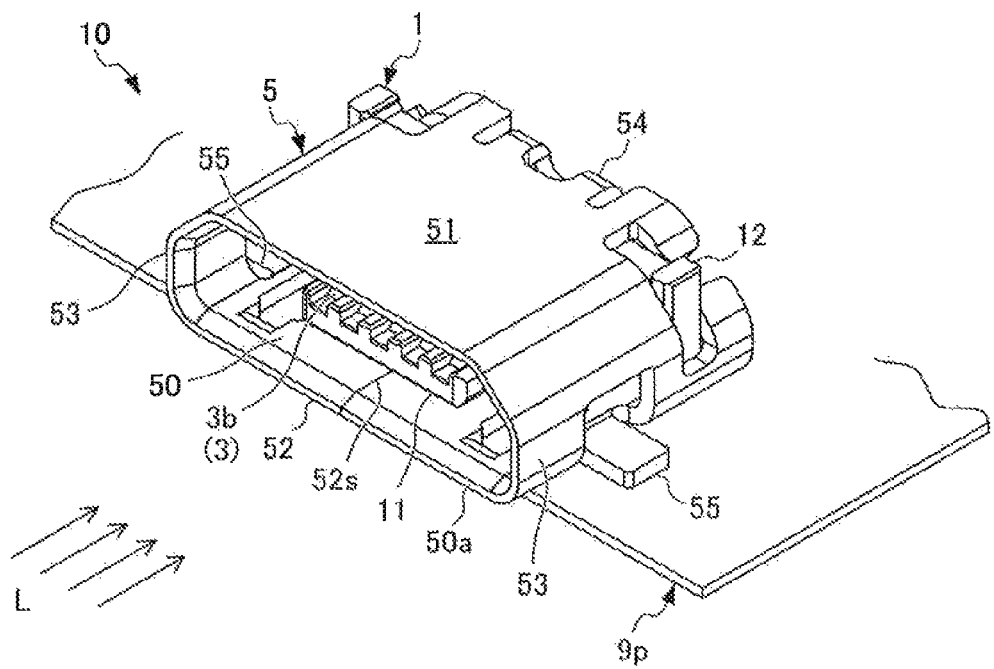
FIG. 1 is a perspective view illustrating a configuration of an interface connector according to a first embodiment of the present invention, the interface connector being viewed from an upper face side.
Figure 2:
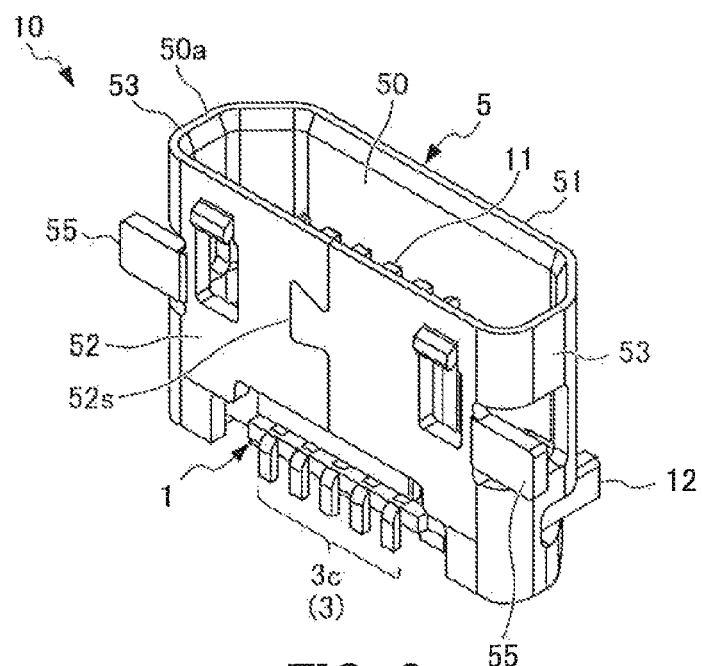
FIG. 2 is a perspective view illustrating a configuration of an interface connector according to the first embodiment, the interface connected being viewed from a bottom face side.

First, the configuration of an interface connector according to a first embodiment of the present invention is described. FIG. 1 is a perspective view illustrating the configuration of an interface connector according to the first embodiment of the present invention, the interface connector being viewed from an upper face side. FIG. 2 is a perspective view illustrating the configuration of an interface connector according to the first embodiment, the interface connected being viewed from a bottom face side. It should also be noted that the arrows L in FIG. 1 simply indicate an irradiating direction as a feature, and the actual laser irradiation ends in the middle of manufacturing processing to form the configuration of FIG. 1 (refer to FIG. 7B and FIG. 8B).

Figure 3:
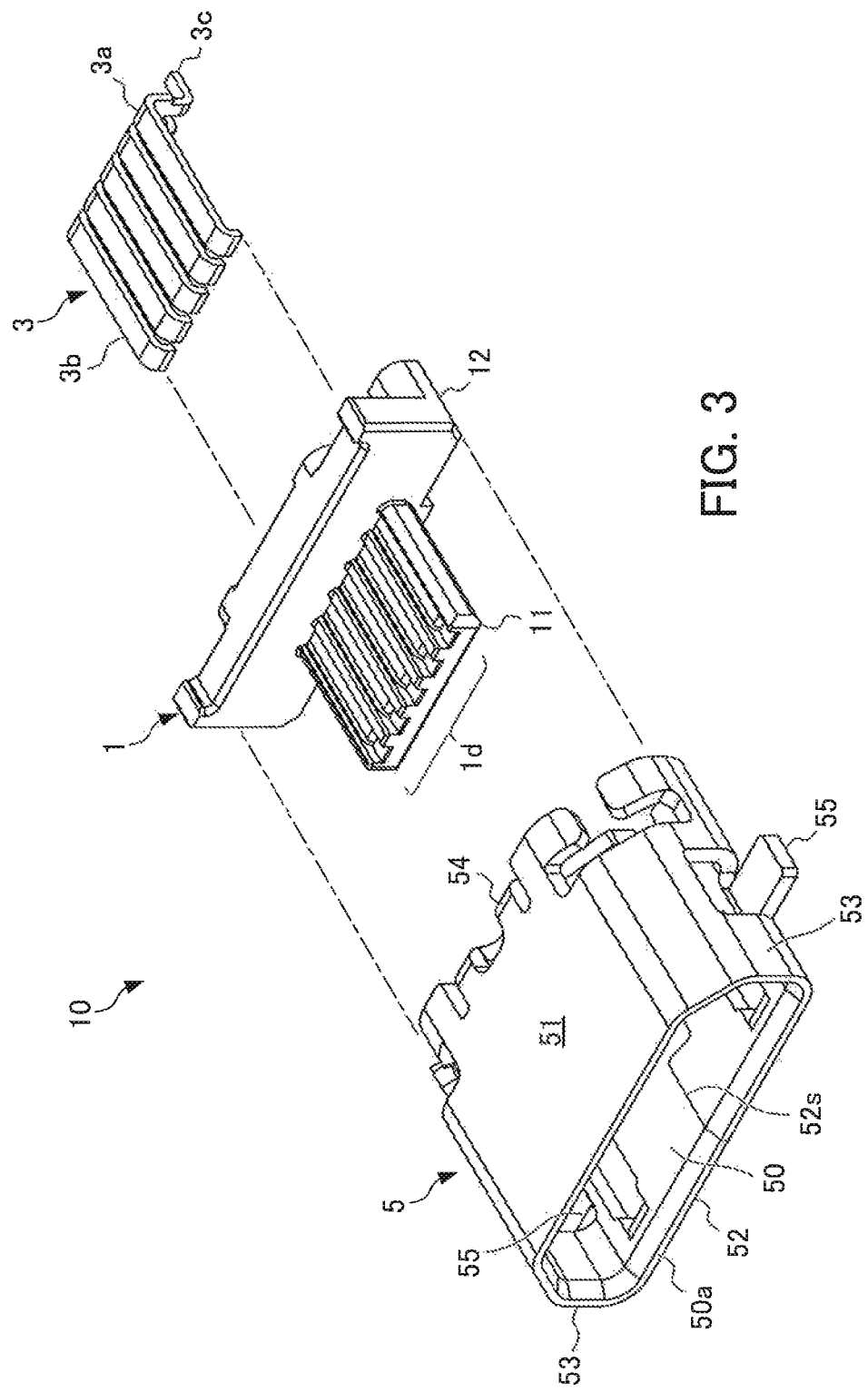
FIG. 3 is a perspective exploded view illustrating the configuration of the interface connector according to the first embodiment.
Figure 4:
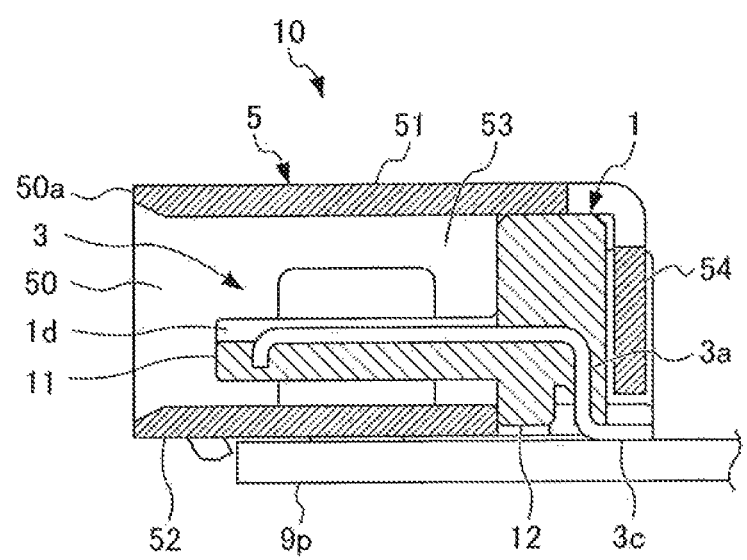
FIG. 4 is a vertical cross-sectional view illustrating the configuration of the interface connector according to the first embodiment.

FIG. 3 is a perspective exploded view illustrating the configuration of the interface connector according to the first embodiment. FIG. 4 is a vertical cross-sectional view illustrating the configuration of the interface connector according to the first embodiment.

1.2 Overall Configuration

With reference to FIGS. 1 to 4, an interface connector (hereinafter abbreviated as "connector") 10 according to the first embodiment includes: an insulating housing 1, a plurality of contacts 3, and a square tube-shaped shell 5 having conductivity. The connector 10 is surface-mounted to a printed circuit board 9p disposed inside an electronic device (not illustrated) (refer to FIG. 1).

With reference to FIG. 3 or FIG. 4, the housing 1 is made of a non-conductive material, and, for example, has a band plate-shaped header portion 11 and a rectangular frame portion 12 that are integrally formed from insulating plastic. The frame portion 12 projects from the header portion 11. A counterpart connector (not illustrated) is fit to the header portion 11. A comb-teeth shaped groove 1d at which a plurality of contacts 3 is arranged in parallel is formed on one face of the header portion 11.

With reference to FIG. 3 or 4, the contact 3 includes a fixing strip 3a, a contact strip 3b, and a lead strip 3c. The fixing strip 3a is integrally molded inside the frame portion 12. The contact strip 3b is accommodated in the groove 1d of the header portion 11 and can contact with a counterpart contact (not illustrated). The lead strip 3c extends to the bottom face side of the frame portion 12 and can be soldered to a conductive pad provided at a surface of the printed circuit board 9p.

With reference to FIGS. 1 to 4, the shell 5 is attached to the housing 1 so as to cover an outer face of the housing 1, and thus constitutes an outer shell of the connector 10. The plurality of contacts 3 can suppress electromagnetic interference by being covered by the shell 5.

1.3 Configuration of Interface Connector

Figure 5A:
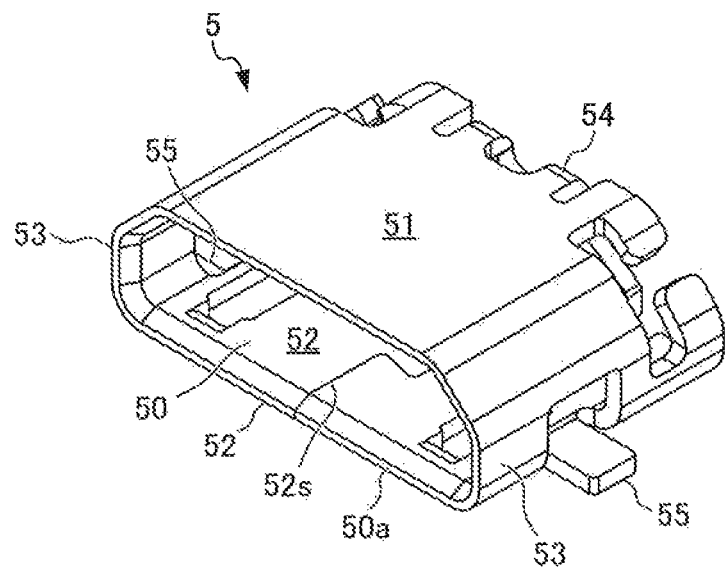
FIGS. 5A and 5B illustrate the configuration of a shell provided to the interface connector according to the first embodiment, FIG. 5A being a perspective view seen from an upper face side and FIG. 5B being a perspective view seen from a bottom face side.
Figure 5B:
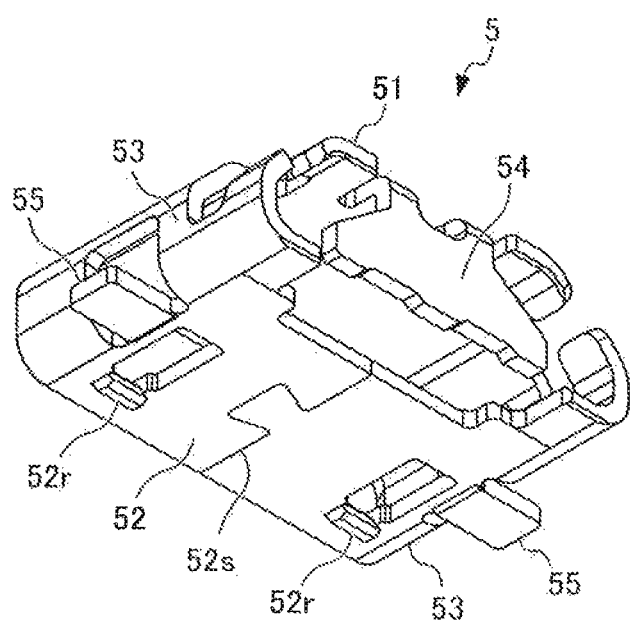

Next, the configuration of the connector 10 according to the first embodiment is described. FIGS. 5A and 5B illustrate the configuration of a shell provided to the interface connector according to the first embodiment. FIG. 5A is a perspective view seen from an upper face side. FIG. 5B is a perspective view seen from a bottom face side.

FIGS. 6A to 6G illustrates the configuration of the shell provided to the interface connector according to the first embodiment. FIG. 6A is a front view of the shell. FIG. 6B is a plan view of the shell. FIG. 6C is a left side view of the shell. FIG. 6D is a right side view of the shell. FIG. 6E is a lower face view of the shell. FIG. 6F is a rear view of the shell. FIG. 6G is a cross-sectional view along the arrow G-G in FIG. 6A.

1.4 Configuration of Shell

With reference to FIGS. 5A and 5B or FIGS. 6A to 6G, the shell 5 is provided with an upper face portion 51, a lower face portion 52, a pair of side face portions 53, 53, and a rear face portion 54. The upper portion 51 covers an upper face of the housing 1 (refer to FIG. 4). The lower face portion 52 covers a lower face of the housing 1 (refer to FIG. 4). At the lower face portion 52, a pair of locking strips 55, 55 is provided which extends in opposite directions at a bottom face of the shell 5. The pair of locking strips 55, 55 can be soldered with, a surface of the printed circuit board 9p (refer to FIG. 1). The pair of side face portions 53, 53 covers both side faces of the housing 1 (refer to FIG. 1).

Furthermore, at the lower face portion 52 of the shell 5, a pair of latch strips 52r, 52r is provided that can be locked with a lock arm provided at a counterpart connector. A carrier 71 described later (refer to FIGS. 7A and 7B) is connected to the rear face portion 54. However, after the rear face portion 54 has been separated, from the carrier 71, the rear face portion 54 is bent from the upper face portion 51 so as to cover the rear face of the housing 1 (refer to FIG. 4).

With reference to FIGS. 5A and 5B or FIGS. 6A to 6G, the shell 5 is composed of an unrolled metal sheet (not illustrated) having a punched pattern in a predetermined shape within a frame of the carrier 71 described later (refer to FIG. 7A) and is configured by bending to form the metal sheet in a square tube shape. In such a case, in order to keep the form of the shell 5, a concave/convex-shaped seam (joint line) 52s is formed at both end edges of the metal sheet so as to mesh with each other at the center portion of the lower face portion 52. Then, by forming the metal sheet in a square tube shape and joining both end edges of the metal sheet, it is possible to acquire a surrounded rectangular opening portion 50 with the plate-thickness face 50a exposed.

Since the shell 5 constitutes the outer shell of the connector 10, the shell 5 has a shielding function as an interface connector. In other words, the connector 10 may be a connector that is designed so as to prevent irradiation of electromagnetic interference from outside to an internal conducting body (contact) and from the internal conducting body (contact). By grounding the pair of locking strips 55, 55 provided at the bottom face of the shell 5 to a ground pattern of the printed circuit board 9p, it is possible to improve an effect of preventing electromagnetic interference.

1.5 Operation of Interface Connector

Next, operation and effects of the connector 10 are described while explaining a manufacturing method of the shell 5 according to the first embodiment.

Figure 7B:
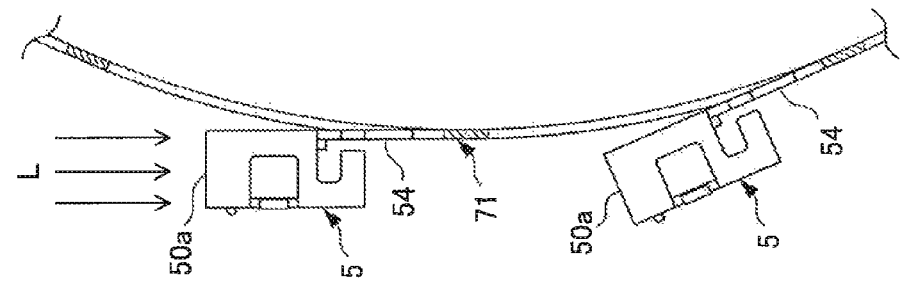
FIGS. 7A and 7B illustrate a state of a carrier being provided consecutively with a shell, FIG. 7A being a front view of the carrier and FIG. 7B being a vertical sectional view in a state of the carrier being wound around a reel.
Figure 7A:
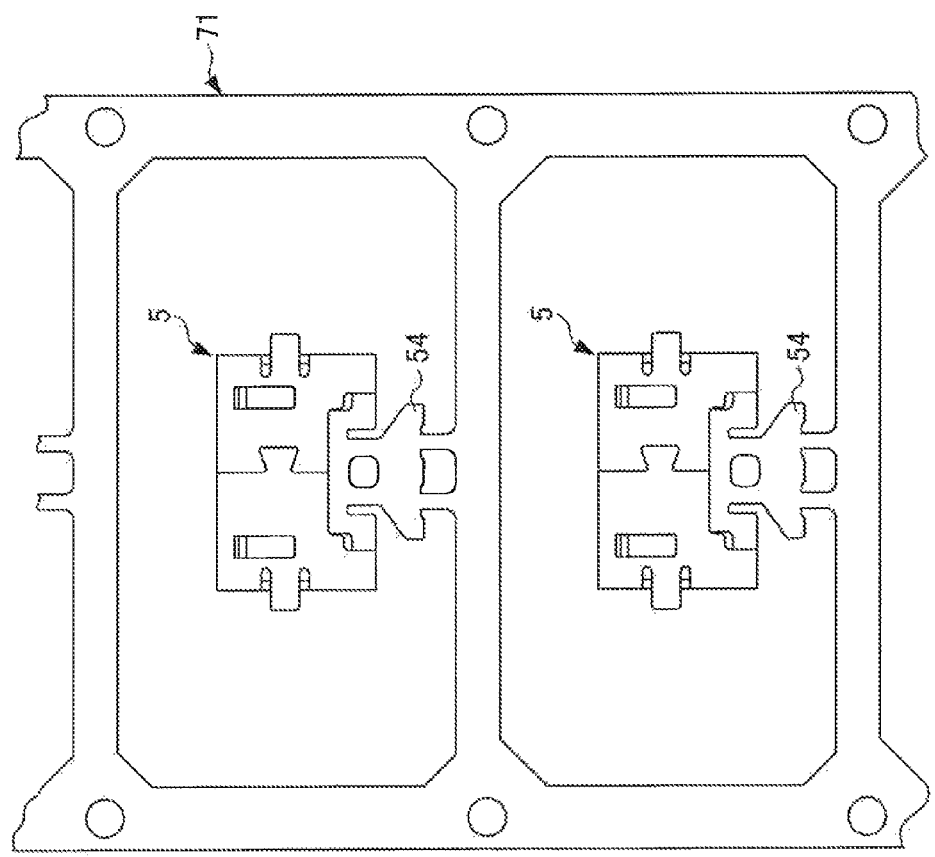
Figure 8A:
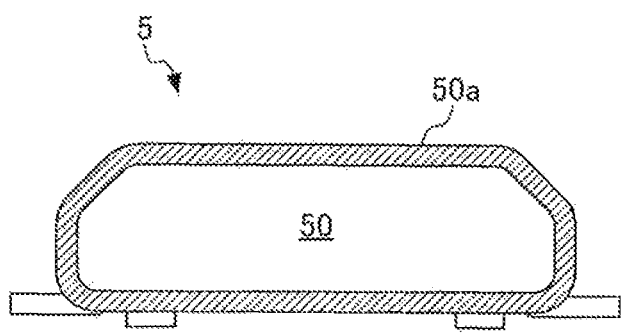
FIGS. 8A and 8B illustrate a state of laser processing being performed on the shell provided to the interface connector according to the first embodiment, FIG. 8A being a front, view of the shell, and FIG. 8B being a partial vertical sectional view of the shell.
Figure 8B:
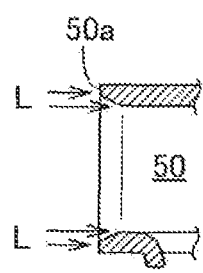

FIGS. 7A and 7B illustrate a state of a carrier being provided consecutively with a shell. FIG. 7A is a front view of the carrier. FIG. 7B is a vertical sectional view in a state of the carrier being wound around a reel. FIGS. 8A and 8B illustrate a state of laser processing being performed on the shell mounted on the interface connector according to the first embodiment. FIG. 8A is a front view of the shell. FIG. 8B is a partial vertical sectional view of the shell.

First, with reference to FIG. 7A, an unrolled metal sheet is produced which has a punched pattern in a predetermined shape within a frame of the carrier 71 composed of a band plate-shaped copper alloy base material or the like. Next, this metal sheet is bent into a square tube shape and joined at both end edges of the metal sheet to form a shell 5, and thus the shell 5 supported, by the carrier 71 can be provided consecutively.

Next, with reference to FIG. 7A, tin-nickel alloy plating is performed on the carrier 71 including a plurality of the shells 5. In this way, a highly solderable layer is formed on an inner face and an outer face including the plate-thickness face of the shell 5. Any plating is sufficient for the highly solderable layer so long as having high solderability, and it is not limited to the tin-nickel alloy plating and may be tin plating, nickel plating, solder plating, and the like.

Next, with reference to FIG. 7B, a laser L is irradiated toward the opening portion 50 of the shell 5 while the reel (not illustrated) around which the carrier 71 is wound is step fed. It is thereby possible to locally heat the thick-plate face 50a of the opening portion 50 of the shell 5 so that the highly solderable layer is transformed to turn black (refer to FIGS. 8A and 8B). In other words, the shell 5 has the plate-thickness face 50a at an end part of the opening portion 50 which is turned black by the laser irradiation while being supported, by the carrier 71. Here, the plate-thickness face 50a at the end part of the opening portion 50 turned black has a tapered shape, and thus, a chamfered portion for the tapered shape is turned black as well.

Next, with reference to FIG. 7A, the connector 10 is completed by incorporating the shell 5 into the housing 1 to which the contact 3 is attached, after separating the rear face portion 54 from the carrier 71 (refer to FIG. 1 or 2). Then, as shown in FIG. 1, the connector 10 is surface-mounted to the printed circuit board 9p. With such a configuration, since the plate-thickness face 50a at the end part of the blackened opening portion 50 is arranged so as to face a lateral face, etc. of an electronic device of which outer appearance (not illustrated) is black, the outer appearance of the electronic device can be coordinated in black.

In accordance with the abovementioned configuration, the connector 10 according to the first embodiment irradiates a laser to the end part of the opening portion 50 of the shell 5, after forming the highly solderable layer on the inner face and the outer face including the plate-thickness face of the shell 5. The plate-thickness face 50a of the end part of the opening portion 50 of the shell 5 can thereby be heated locally to turn black.

In accordance with the abovementioned configuration, the connector 10 according to the first embodiment can prevent a metallic color from being exposed at the end part of the opening portion 50 of the shell 5. Furthermore, the connector 10 can be turned black by irradiating the laser L at the plate-thickness face 50a of the opening portion 50 without adversely affecting the highly solderable layer formed at the pair of locking strips 55, 55 soldered to the printed circuit board 9p. In other words, the connector 10 according to the first embodiment can maintain both an outer appearance mounted on an electronic device and solderability to a printed circuit board.

2. Second Embodiment 2.1 Configuration of Interface Connector

Figure 9:
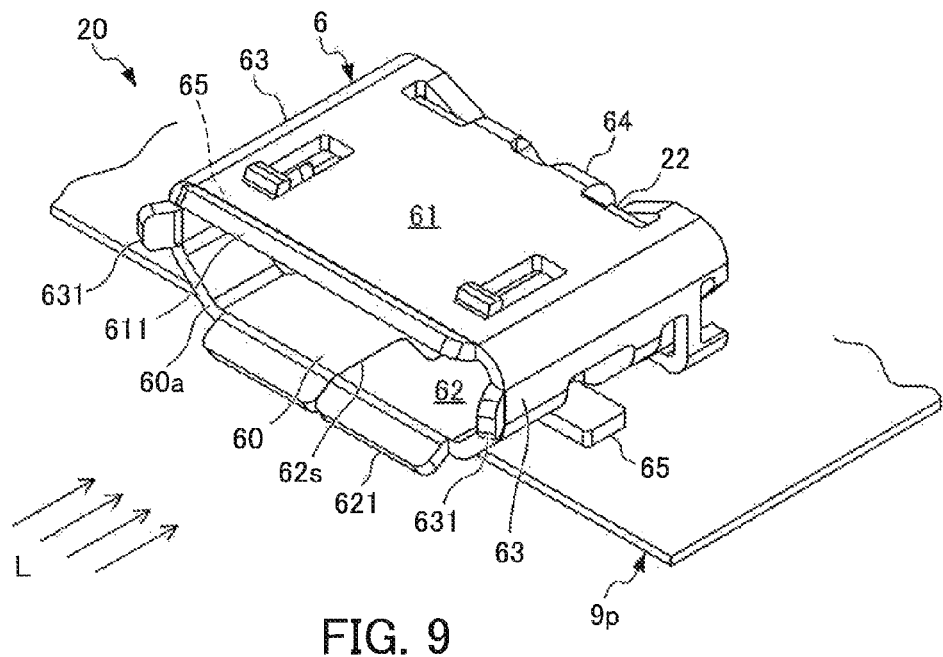
FIG. 9 is a perspective view illustrating the configuration of an interface connector according to a second embodiment of the present invention, the interface connector being viewed from an upper face side.
Figure 10:
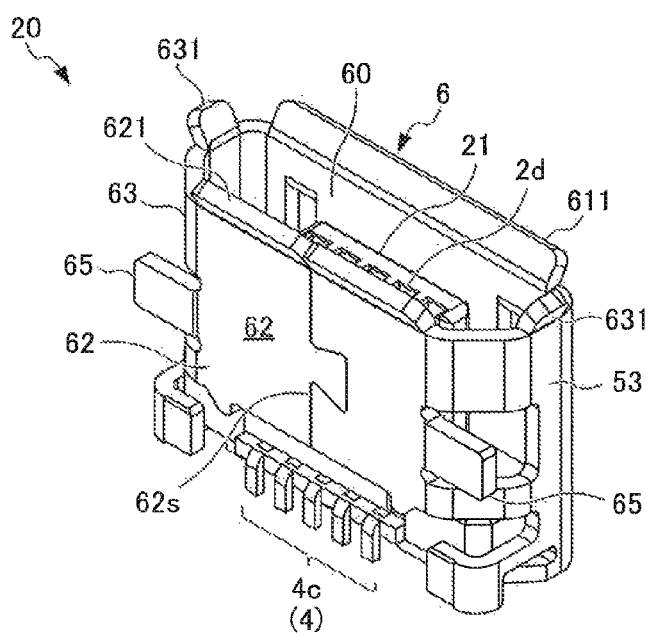
FIG. 10 is a perspective view illustrating the configuration of an interface connector according to the second embodiment, the interface connector being viewed from a bottom face side.

Next, the configuration of an interface connector according to a second embodiment of the present invention is described. FIG. 9 is a perspective view illustrating the configuration of an interface connector according to the second embodiment of the present invention, the interface connector being viewed from an upper face side. FIG. 10 is a perspective view illustrating a configuration of an interface connector according to the second embodiment, the interface connector being viewed from a bottom face side. It should also be noted that the arrows L in FIG. 9 simply indicate an irradiating direction as a feature, and the actual laser irradiation ends in the middle of manufacturing processing to form the configuration of FIG. 9 (refer to FIG. 15B and FIG. 16B).

Figure 11:
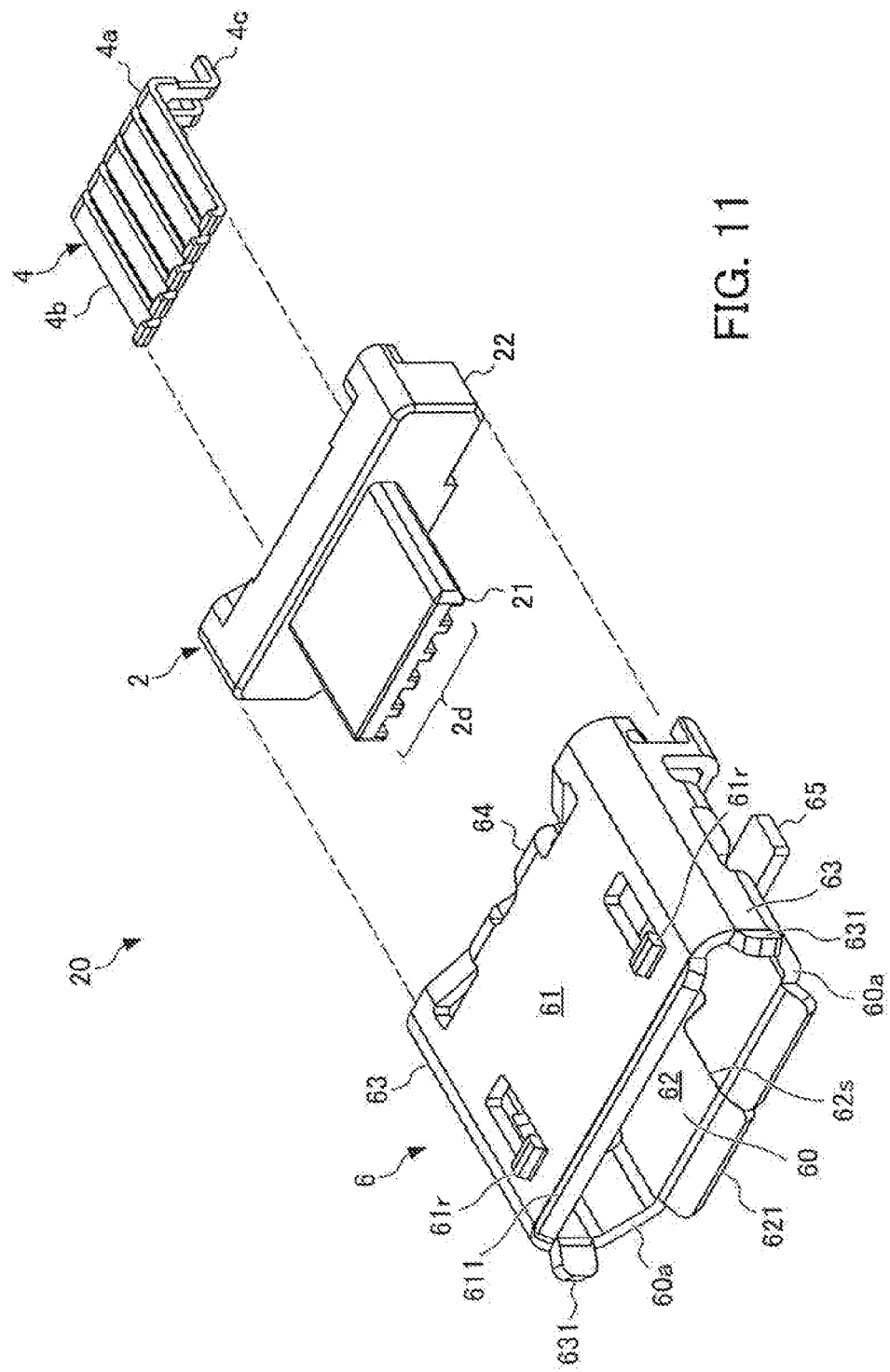
FIG. 11 is a perspective exploded view illustrating a configuration of the interface connector according to the second embodiment.
Figure 12:
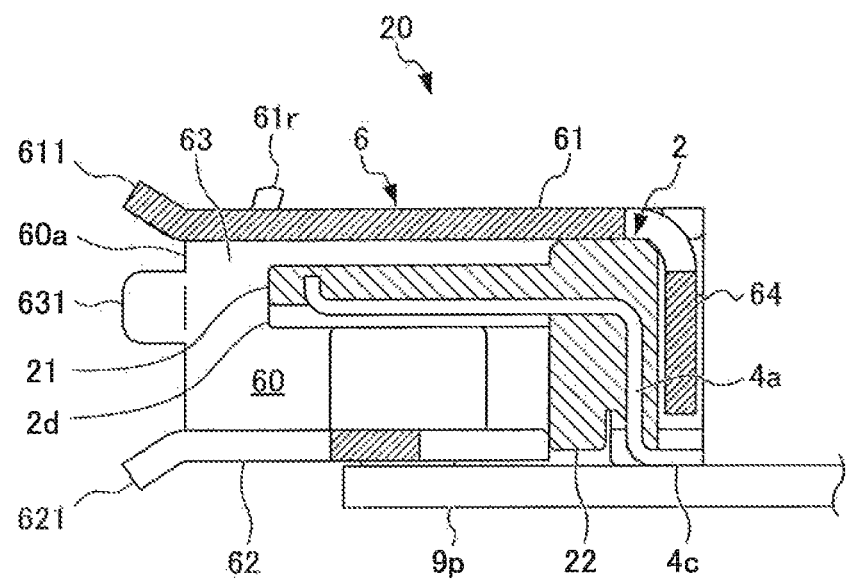
FIG. 12 is a vertical cross-sectional view illustrating a configuration of the interface connector according to the second embodiment.

FIG. 11 is a perspective exploded view illustrating the configuration of the interface connector according to the second embodiment. FIG. 12 is a vertical cross-sectional view illustrating the configuration of the interface connector according to the second embodiment. 18

2.2 Overall Configuration

With reference to FIGS. 9 to 12, a connector 20 according to the second embodiment includes: an insulating housing 2, a plurality of contacts 4, and a square tube-shaped shell 6 having conductivity. The connector 20 is surface-mounted on a printed circuit board 9p disposed inside an electronic device (not illustrated) (refer to FIG. 9).

With reference to FIG. 11 or FIG. 12, the housing 2 is made of non-conductive material, and, for example, has a band plate-shaped header portion 21 and a rectangular frame portion 22 that are integrally formed from insulating plastic. The frame portion 22 projects from the header portion 21. A counterpart connector (not illustrated) is fit to the header portion 21. A comb-teeth shaped groove 2d at which a plurality of contacts A is arranged In parallel is formed on one face of the header portion 21 (a face opposite to a flat face appearing in FIG. 11).

With reference to FIG. 11 or 12, the contact 4 includes a fixing strip 4a, a contact strip 4b, and a lead strip 4c. The fixing strip 4a is integrally molded inside the frame portion 22. The contact strip 4b is accommodated in the groove 2d of the header portion 21 and can contact with a counterpart contact (not illustrated). The lead strip 4c extends to the bottom face side of the frame portion 22 and can be soldered to a conductive pad provided at a surface of the printed circuit board 9p.

With reference to FIGS. 9 to 12, the shell 6 is attached to the housing 2 so as to cover an outer face of the housing 2 and thus constitutes an outer shell of the connector 20. The plurality of contacts 4 can suppress electromagnetic interference by being covered by the shell 6.

2.3 Configuration of Interface Connector

Figure 13A:
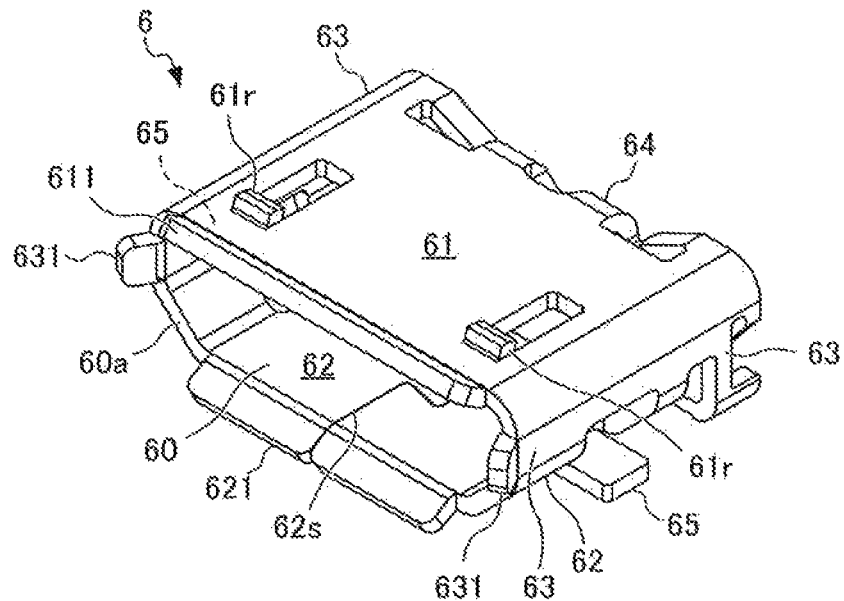
FIGS. 13A and 13B illustrate the configuration of a shell, provided, to the interface connector according to the second embodiment, FIG. 13A being a perspective view seen from an upper face side and FIG. 13B being a perspective view seen from a bottom face side.
Figure 13B:
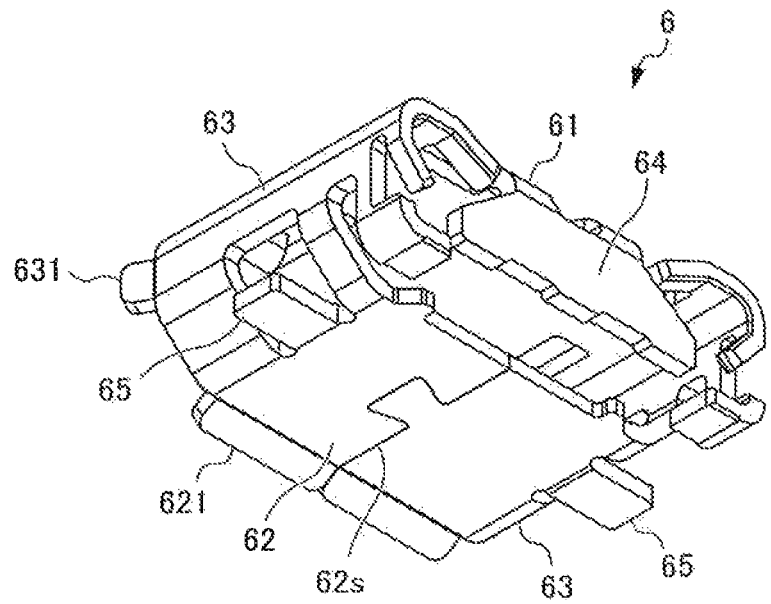

Next, the configuration of the connector 20 according to the second embodiment is described. FIGS. 13A and 13B illustrate the configuration of a shell mounted on the interface connector according to the second embodiment. FIG. 13A is a perspective view seen from an upper face side. FIG. 13B is a perspective view seen from a bottom face side.

FIGS. 14A to 14G illustrate the configuration of the shell mounted on the interface connector according to the second embodiment. FIG. 14A is a front view of the shell. FIG. 14B is a plan view of the shell. FIG. 14C is a left side view of the shell. FIG. 14D is a right side view of the shell. FIG. 14E is a lower face view of the shell. FIG. 14F is a rear view of the shell. FIG. 14G is a cross-sectional view along the arrow G-G in FIG. 14A.

2.4 Configuration of Shell

With reference to FIGS. 13A and 13B or FIGS. 14A to 14G, the shell 6 is provided with an upper face portion 61, a lower face portion 62, a pair of side face portions 63, 63, and a rear face portion 64. The upper face portion 61 covers an upper face of the housing 2 (refer to FIG. 12). The lower face portion 62 covers a lower face of the housing 2 (refer to FIG. 12). At the lower face portion 62, a pair of locking strips 65, 65 is provided which extends in opposite directions at a bottom face of the shell 6. The pair of locking strips 65, 65 can be soldered to a surface of the printed circuit board 9p (refer to FIG. 9). The pair of side face portions 63, 63 covers both side faces of the housing 2 (refer to FIG. 9).

Furthermore, with reference to FIGS. 13A or 13B or FIGS. 14A to 14G, at the upper face portion 61 of the shell 6, a pair of latch strips 61r, 61r is provided that can be locked with a lock arm provided at a counterpart connector. A carrier 72 described later (refer to FIGS. 15A and 15B) is connected to the rear face portion 64. However, after the rear face portion 64 has been separated from the carrier 72, the rear face portion 64 is bent from the upper face portion 61 so as to cover the rear face of the housing 2 (refer to FIG. 12).

With reference to FIGS. 13A and 13B or FIGS. 14A to 14G, the shell 6 is composed of an unrolled metal sheet (not illustrated) having a punched pattern in a predetermined shape within a frame of the carrier 72 described later (refer to FIG. 15A), and is configured by bending the metal sheet in a square tube shape. In such a case, in order to keep the form of the shell 6, a concave/convex-shaped seam (joint line) 62s is formed at both end edges of the metal sheet so as to mesh with each other at the center portion of the lower face portion 62. Then, by forming the metal sheet in a square tube shape and joining both end edges of the metal sheet, it is possible to acquire a surrounded rectangular opening portion 60 with the plate-thickness face 60a exposed.

With reference to FIGS. 13A and 13B or FIGS. 14A to 14G, the opening portion 60 includes an upper portion guide strip 611, a lower portion guide strip 621, and a pair of lateral portion guide strips 631, 631. The upper portion guide strip 611 is configured such that the vicinity of an edge of the upper face portion 61 of the shell 6 is bent outward. The lower portion guide strip 621 is configured such that the vicinity of an edge of the lower face portion 62 of the shell 6 is bent outward. The pair of lateral portion guide strips 631, 631 is configured such that the vicinity of an edge of the lateral face portions 63, 63 of the shell 6 is bent outward.

By providing the upper portion guide strip 611, the lower portion guide strip 621, and the pair of lateral portion guide strips 631, 631 at the opening portion 60, a counterpart housing (not illustrated) can be readily Led to the opening portion 60. Furthermore, as described above, the end part of the opening portion 60 that is turned black by laser irradiation includes extension portions of the inner face of the shell 6 which respectively correspond to these guide strips 611, 621, and 631, and further includes a plate-thickness face 60a of the shell 6 adjacent to these extension portions (refer to FIG. 16).

2.5 Operation of Interface Connector

Next, operation and effects of the connector 20 are described while explaining a manufacturing method of the shell 6 according to the second embodiment.

Figure 16A:
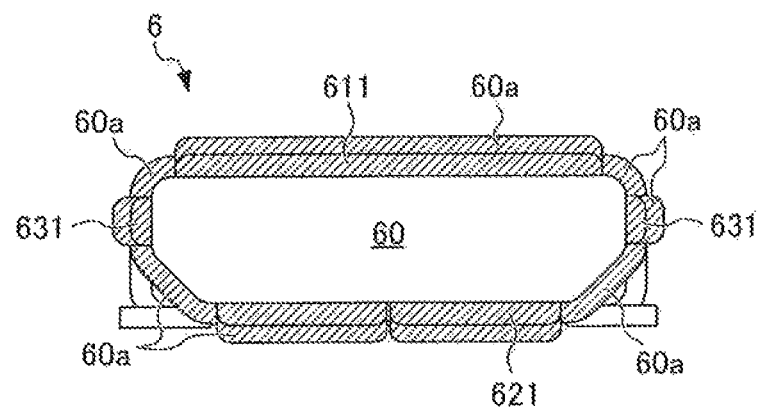
FIGS. 16A and 16B illustrate a state of laser processing being performed on the shell provided to the interface connector according to the second embodiment, FIG. 16A being a front view of the shell and FIG. 16B being a partial vertical sectional view of the shell.
Figure 16B:
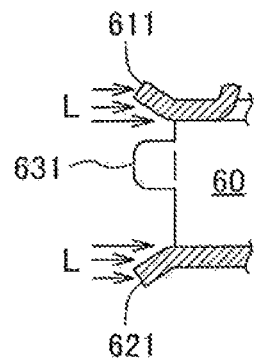

FIGS. 15A and 15B illustrate a state of a carrier being provided consecutively with a shell. FIG. 15A is a front view of the carrier. FIG. 15B is a vertical sectional view in a state of a carrier being wound around a reel. FIGS. 16A and 16B illustrate a state of laser processing being performed on the shell mounted, on the interface connector according to the second embodiment. FIG. 16A is a front view of the shell. FIG. 16B is a partial vertical sectional view of the shell.

First, with reference to FIG. 15A, an unrolled metal sheet is produced which has a punched pattern in a predetermined shape within a frame of the carrier 72 composed of a band plate-shaped copper alloy base material or the like. Next, this metal sheet is bent, into a square tube shape and joined at both end edges of the metal sheet to form the shell 6 and thus the shell 6 supported by the carrier 72 can be provided consecutively.

Next, with reference to FIG. 15A, tin-nickel alloy plating is performed on the carrier 72 including a plurality of the shells 6. In this way, a highly solderable layer is formed on an inner face and an outer face including the plate-thickness face of the shell 6. Any plating is sufficient for the highly solderable layer so long as having high solderability, and it is not limited to the tin-nickel alloy plating and may be tin plating, nickel plating, solder plating, and the like.

Next, with reference to FIG. 15B, a laser L is irradiated toward the opening portion 60 of the shell 6 while the reel (not illustrated) around which the carrier 72 is wound is step fed. It is thereby possible to locally heat the extension portions of the inner face of the shell 6 which, respectively correspond to the upper portion guide strip 611, the lower portion guide strip 621, and the pair of lateral portion guide strips 631, 631 as well as the plate-thickness face 60a of the shell 6 adjacent to these extension portions so that the highly solderable layer is transformed to turn, black (refer to FIGS. 16A and 16B). In other words, the shell 6 has the extension portions of the inner face of the shell 6 which respectively correspond to the upper portion guide strip 611, the lower portion guide strip 621, and the pair of lateral portion guide strips 631, 631 as well as the plate-thickness face 60a of the shell 6 adjacent to these extension portions which are the end part of the opening portion 60 that is turned black by the laser irradiation while being supported by the carrier 72.

Next, with reference to FIG. 15A, the connector 20 is completed by incorporating the shell 6 into the housing 2 to which the contact 4 is attached after separating the rear face portion 64 from the carrier 72 (refer to FIG. 9 or 10). Then, as shown in FIG. 9, the connector 20 is surface-mounted to the printed circuit board 9p. With such a configuration, since an exposed face of the end part of the blackened opening portion 60, i.e. the extension portions of the inner face of the shell 6 which respectively correspond to each guide strip 611 621, and 631 as well as the plate-thickness face 60a of the shell 6 adjacent to these extension portions are arranged so as to face a lateral face, etc. of an electronic device (not illustrated) of which the outer appearance is black, the outer appearance of the electronic device can be coordinated in black.

In accordance with the abovementioned configuration, the connector 20 according to the second embodiment irradiates a laser onto the extension portions of the inner face of the shell 6 which respectively correspond to each guide strips 611, 621, and 631 as well as the plate-thickness face 60a of the shell 6 adjacent to these extension portions provided at the end part of the opening portion 60 of the shell 6, after forming the highly solderable layer on the inner face and the outer face including the plate-thickness face of the shell 6. The extension portions of the inner face of the shell 6 which respectively correspond to the upper portion guide strip 611, the lower portion guide strip 621, and the pair of lateral portion guide strips 631, 631 as well as the plate-thickness face 60a of the shell 6 adjacent to these extension, portions at the end. part of the opening portion 60 of the shell 6 can thereby be heated locally to turn black.

In accordance with the abovementioned configuration, the connector 20 according to the second embodiment can prevent a metallic color from being exposed at the end part of the opening portion 60 of the shell 6. Furthermore, the connector 20 can be turned black by irradiating the laser L onto the extension portions of the inner face of the shell 6 which respectively correspond to each guiding strip 611, 621, and 631 as well as the plate-thickness face 60a of the shell 6 adjacent to these extension portions, without adversely affecting highly solder able layer formed at the pair of locking strips 65, 65 soldered to the printed circuit board 9p. In other words, the connector 20 according to the second embodiment can maintain both an outer appearance mounted on an electronic device and solderability to a printed circuit board.

What is claimed is:

1. An interface connector comprising:
an insulating housing including a frame portion and a band plate-shaped header portion projecting from the frame portion and being fit to a counterpart connector;
a plurality of contacts arranged in parallel on one face of the header portion;
a conductive shell of a square tube shape that has an inner face surrounding the header portion and to which the frame portion is fixed internally, and a highly solderable layer that is formed on an inner face and an outer face including a plate-thickness face of the shell,
wherein the shell includes an opening portion that is exposed outward and through which a counterpart housing is inserted and extracted, the opening portion including an end part of the opening portion that is turned black by way of laser irradiation.

2. The interface connector according to claim 1, wherein the end part of the opening portion that is turned black by way of laser irradiation includes a predetermined plate-thickness face of the shell.

3. The interface connector according to claim 2, wherein the opening portion of the shell includes an upper portion guide strip that is configured such that an edge vicinity of an upper face portion of the shell is bent outward; a lower portion guide strip that is configured such that an edge vicinity of a lower face portion of the shell is bent outward, and a pair of lateral portion guide strips that is configured such that an edge vicinity of a lateral portion of the shell is bent outward, and the end part of the opening portion that is turned black by way of laser irradiation includes an extension portion of an inner face of the shell that corresponds to each guide strip, respectively.

4. The interface connector according to claim 1, wherein the shell includes:

a pair of locking strips for soldering that extends in opposite directions at a bottom face of the shell.

5. The interface connector according to claim 1, wherein the shell is formed by an unrolled metal sheet having a pattern on a carrier member being bent, the shell further including:

a highly solderable layer that is formed on an inner face and an outer face of the shell including a plate-thickness face of the metal sheet; and a pair of locking strips soldered to a printed circuit board, the pair of locking strips being provided at a bottom face of the shell and extending in opposite directions according to a pattern of the metal sheet.

6. The interface connector according to claim 5, wherein the shell includes an end part of the opening portion that is turned black by way of laser irradiation, in a state in which the shell is being supported by the carrier member.

* * * * *